United States Patent [19]

Griffin et al.

[11] Patent Number: 4,468,303

[45] Date of Patent: Aug. 28, 1984

[54] METAL RECOVERY

[75] Inventors: Arnold F. Griffin, Scarborough; Michael C. Costello, Greenwood, both of Australia

[73] Assignee: Norcim Investments Pty Ltd., Osborne Park, Australia

[21] Appl. No.: 445,847

[22] Filed: Dec. 1, 1982

[51] Int. Cl.³ .............................................. C25C 1/20
[52] U.S. Cl. ...................................... 204/109; 204/3; 204/110; 75/101 BE; 75/109; 75/118 R; 423/24; 423/25; 210/673; 210/674
[58] Field of Search ................................ 204/109–110, 204/3–4; 75/101 BE, 109, 118 R; 423/24, 25; 210/673, 674

[56] References Cited

U.S. PATENT DOCUMENTS

| | | | |
|---|---|---|---|
| 3,512,252 | 5/1970 | Sargent | 204/9 |
| 3,840,365 | 10/1974 | Hammes, Sr. et al. | 75/118 R |
| 3,935,006 | 1/1976 | Fischer | 75/118 R |
| 4,186,085 | 1/1980 | Savage | 210/673 |
| 4,201,605 | 5/1980 | Savage et al. | 210/673 |
| 4,372,830 | 2/1983 | Law | 75/101 BE |

FOREIGN PATENT DOCUMENTS 1802888  5/1970  Fed. Rep. of Germany ...... 210/673

Primary Examiner—R. L. Andrews
Attorney, Agent, or Firm—Bernard, Rothwell & Brown

[57] ABSTRACT

The present invention provides in one aspect a process in which a particulate material containing water and having adsorbed thereon a solubilized gold compound is located in packed form in a fractionating column, a liquid containing a major proportion of water miscible organic liquid is boiled in an evaporator such that it enters the packed fractionating column as a vapor, said water miscible organic liquid being more volatile than water and being preferentially retained in the column.

The present invention provides in another aspect a method of recovering gold from an aqueous solution, which comprises placing the gold containing aqueous solution in a cell comprising a gold, silver, aluminium or copper cathode and an inert electrode, subjecting the solution to electrolysis in the cell so as to deposit a gold foil on the cathode.

14 Claims, 1 Drawing Figure

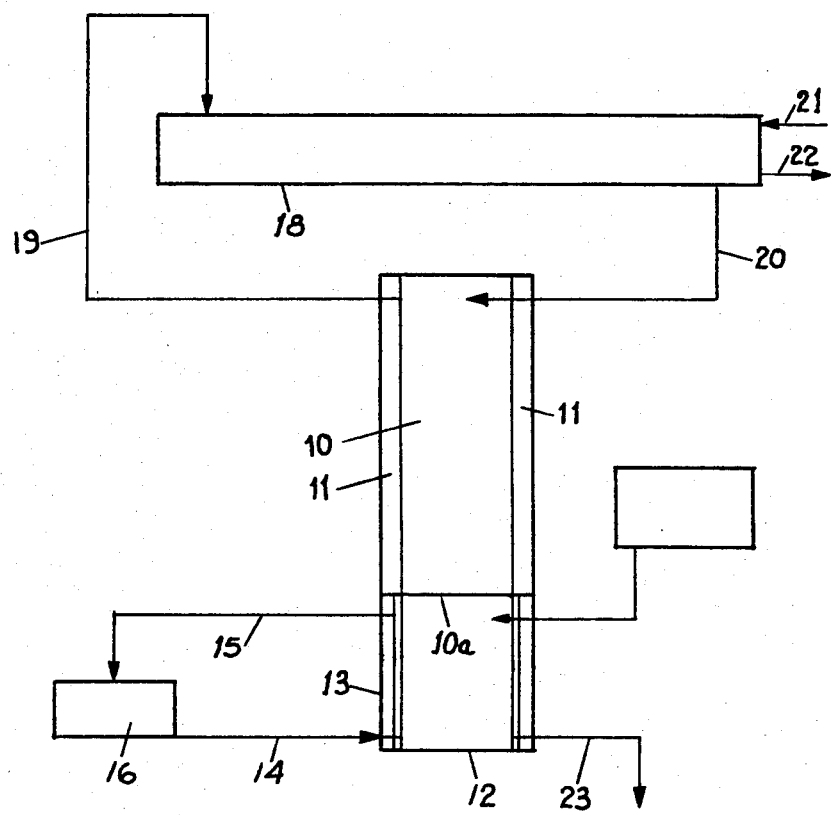

METAL RECOVERY

The present invention relates to metal recovery.

Gold is typically recovered from ores or concentrates by treating the ore or concentrate with aqueous sodium or calcium cyanide in the presence of oxygen. The gold forms a soluble complex with the cyanide.

To separate the soluble metal rich portion of the resulting slurry or solution the slurry or solution may be contacted with an adsorbent material such as carbon, activated carbon, ion exchange resins, attapulgite, silica or alumina gel or one of a number of organic compounds both natural and synthetic. In practice, the adsorbent material adsorbs many different compounds including gold, silver, copper, nickel, iron, calcium and magnesium both as simple and complex compounds. In an alternative process, the slurry or solution containing a soluble gold cyanide complex may be contacted with a less noble metal such as zinc or aluminium. In this case the gold is extracted from the soluble complex by cementation.

The next step is to recover the gold from the cementation product or from the adsorbent material to obtain a salable product which is called Doré Bullion.

In the past gold has been recovered from adsorbent materials by burning combustible adsorbent material which was usually activated carbon, and smelting the ash with fluxes. Thus, the adsorbent material was destroyed.

In the early 1950's an elution process called the Zadra process was developed in the United States and this process with local modifications has been used by gold producers in a number of countries.

In the Zadra process, gold laden carbon is eluted in batches with a near-boiling caustic-cyanide solution in closed circuit with one or more electrolytic cells and a heater to maintain the desired eluant temperature. The redissolving of gold from the carbon is temperature dependant and the time of elutriation may be reduced from 4–5 days to 1–2 days by increasing the elution temperature to above 100° C. by pressurizing the system.

In alternative procedures methanol, methyl cyanide and deionised water have been used as eluants in systems which are modifications of the Zadra process.

The present invention provides a process in which gold and other metals including silver and copper, may be desorbed from an adsorbent material.

The gold is mainly present on the adsorbent material in the form of a highly insoluble compound which is probably calcium aurocyanide. Thus, to enable the gold values to be recovered it is necessary to convert the gold to a soluble form and subject the adsorbent material to a leaching.

In accordance with the present invention there is provided a process in which a particulate material containing water and having adsorbed thereon a solubilised gold compound is packed in a fractionating column, a liquid containing a major proportion of water-miscible organic liquid is boiled in an evaporator such that it enters the fractionating column as a vapour, said water soluble organic liquid being more volatile than water and being preferentially retained in the column.

Preferably, in the process of the present invention, the vapour from the boiling organic liquid enters the carbon column and condenses on the carbon, and on the liquids adsorbed onto the carbon. The entire charge is therefore heated and temperatures approaching 100° C. occur on the column. The front of heated solvent rises through the carbon bed until it has heated the entire bed and the vapour then breaks through the top of the column and is piped to a condenser, condensed and subcooled. This subcooled condensed vapour may be passed through a flowmeter and then returned to the top of the column via a liquid distributor. The condensed liquid works its way by gravity down the column countercurrent to the rising vapours and the process of fractionating occurs using the carbon as the packing in a fractionating column. When the process reaches equilibrium the more volatile low boiling solvent is produced at the top of the column and the gold bearing water originally present on the carbon exists in the evaporator. The process is typically continued until such time as the bulk of the gold such as at least 80% by weight preferably at least 90% by weight, is in the evaporator and the bulk of the water soluble organic liquid is in the fractionating column.

By this time, the liquid in the evaporator typically contains a relatively high gold concentration which may be in excess of 3000 milligrams per liter and can be as high as 6000 milligrams per liter or more dependent on the gold loading of the carbon used.

The organic liquid is preferably methanol but other organic liquids such as alcohols, ketones or nitriles could be used if desired. For example, the organic liquid could be acetone or acetonitrile. The particulate material is typically carbon although other particulate materials could be used if desired.

The volume of water soluble organic liquid required is relatively low being typically less than 1 bed volume. In many instances it is found that the optimum amount of water soluble organic liquid is 0.5 bed volume. Following completion of the reflux period the pure solvent may be directed away from the column and into storage for reuse in the next cycle. During this time the level in the evaporator falls and the top and bottom column temperatures rise. When the evaporator level falls to be equal to the water content of the original carbon charge the pregnant concentrate may be drained into an electrolytic cell. Steam may be injected under the carbon bed and the remaining solvent displaced from the carbon, part to storage for reuse and part to waste. This process is continued until the column top temperature reaches 99° C. at which time the solvent is displaced from the carbon making it available for reuse.

The gold rich aqueous solution may be subject to a number of techniques to recover the gold for smelting and refining. The gold concentration depends on the initial gold concentration in the particulate material. The solution contains water, gold, other desorbed soluble compounds and excess reagents intially present in the particulate material and a variety of organic compounds.

For example, the gold rich solution can be subject to evaporation of liquids, cementation by zinc/lead, electrodeposition or precipitation such as by sulphur dioxide or oxalic acid.

It has been found in particular that the solution can be subject to electrodeposition using an aluminium cathode as will be described hereinafter in more detail.

The gold deposits on the aluminium.

Subsequently, the aluminium can be removed by being dissolved in diluted aqueous sodium hydroxide.

Initially, the gold bearing particulate material may be water washed to remove material such as clay or ore chips from the pulp. Then, the gold may be solubilised by soaking the cleaned particulate material for an appropriate time in an aqueous solution of an appropriate reagent such as aqueous strong caustic cyanide solution. The solubilising treatment may be continued for about 1 hour. The so treated particulate material is, as described above, charged into a fractionating column, and excess solution drained. Alternatively, the cleaned particulate material may be charged into the fractionating column and treated with the solubilising reagent whilst in the fractionating column. The treated material is allowed to drain until most of the water has been removed. Residual caustic cyanide solution can be discarded or reused after reagent adjustment.

The present invention will now be described, by way of example, with reference to the accompanying drawing which is a schematic side elevation of an apparatus which may be used for carrying out the process of the present invention.

The apparatus shown in the drawing comprises a fractionating column 10 having insulated sides 11 and arranged to receive a charge of gold bearing particulate material. The fractionating column 10 conveniently comprises a lid or the like to enable gold laden particulate material to be loaded into it and an exit means adjacent the lower end of the column for removal of treated material. A carbon screen 10a separates the column 10 from an evaporator 12 to be described. Alternatively, the particulate material may be contained in a separate cartridge with a carbon support screen which can be inserted as a whole in the column 10 and removed when desorption is complete.

Beneath the column 10 is an evaporator 12 containing a quantity of methanol which may contain some water. In use, the column 10 is packed with a charge of carbon having adsorbed thereon gold said gold being pretreated or treated in the column to solubillse, it as described above. The evaporator 12 also comprises an insulated heating jacket 13 connected by lines 14 and 15 to a heating system 16. The heating jacket 13, lines 14 and 15 and heating system 16 contain heating oil which is circulated by means (not shown) through the system.

Further, the column 10 contains a number of temperature sensors (not shown) to enable the temperature in the column 10 to be monitored. This assists in establishing the progress of the process at any time. On top of the column 10 is a reflux condenser system 18. The condenser system 18 is connected to the column 10 by means of lines 19 and 20. The condenser system 18 is water cooled and comprises a water inlet line 21 and a water outlet 22.

In use, about 0.5 bed volume of organic liquid such as methanol is placed in the evaporator 12. Henceforth the process will be described with particular reference to methanol and carbon although it is to be understood that other organic liquids and other particulate materials can be used if desired. The methanol is boiled by being heated by heating oil in the jacket 13 and enters the column 10 as a vapour.

There is then established a dynamic process whereby water drains from the column 10 in preference to the more volatile methanol. Methanol vapour rises and enters the water bearing carbon packing in the column 10. The methanol vapour condenses upon contacting the colder particulate material and is thereby converted into liquid. The methanol liquid heats the water and mixes with it. Solubilised gold compounds are dissolved by the methanol and the dissolved compounds flow down the column 10 with the methanol-water mixture. This process continues until the whole of the charge is heated and has a water-methanol content of various proportions throughout the entire column of particulate material.

The approximate temperatures existing in this stabilised condition are evaporator 75° C., lower carbon layer 68° C. and upper carbon layer 65° C. The amount of heat applied then controls the rate of boiling and hence the amount of methanol rich vapour issuing from the top of the column 10 and entering the condenser system 18.

The rate of reflux can be from 0.1 bed volumes per hour to 0.5 bed volumes per hour depending on the type and particle size of the carbon, the height to diameter ratio of the column 10, the available heat and time allocated for the desorption.

During the process, solution samples may be periodically withdrawn from the evaporator and gold concentrations determined. These values may be noted and when the gold concentration reaches a steady value the gold transfer to the evaporator is considered complete. Whilst heating continues oil is heated in the heater system 16, passed along the line 14 into the jacket 13 and then through the line 15 to the heating system 16. Methanol is driven from the top of the column 10 but it is condensed in the condenser system 18 and returned to the column 10 along the line 20. The methanol vapour passes along the line 19 to the condenser system 18, is condensed to liquid and returns to the column 10 via the line 20. The condenser system 18 is cooled by passing cool water into the condenser through the line 21 and passing used water out of the condensor along the line 22.

The concentration of methanol in the evaporator 12 gradually decreases whilst the water concentration gradually increases.

The process is preferably continued until substantially all the gold has been desorbed.

The concentrated gold solution in the evaporator 12 can be drained off through an outlet line 23 for further treatment.

Prior to this, the methanol which is condensed in the reflux condenser system 18 is directed through an outlet (not shown) in the line 20 to storage for subsequent further use. The temperature in the evaporator 12 begins to rise and the system becomes impoverished in methanol. This continues until the recovered condensate temperature reaches 75–80° and the solution in the evaporator has a boiling point of 95–100° C. Heating is then discontinued.

The condenser system 18 can be horizontal or vertical, separate (as shown) or located directly on top of the column 10 so forming an integral part thereof. The heating system 16 can be heated by burning a fuel or by waste heat such as from diesel engines. The choice of fuel is in practice dictated by site conditions and facilities. The heating medium may also be steam from a conventional package boiler.

The solution recovered from the evaporator contains almost no methanol, but water and eluted compounds including organic material. The recovered material is removed and sampled and the gold content determined. This is usually double the concentration of gold in the original carbon.

One preferred metal recovery method involves subjecting an aqueous gold containing solution to electrodeposition in a cell using an aluminium cathode and a metal anode. The gold deposits on the aluminium and the aluminium may then be removed by being dissolved in an aqueous sodium hydroxide solution.

It has been found that aqueous alkali solutions, preferably having a pH of at least 10, and containing dissolved metal such as gold or silver, can be subjected to electrolysis so as to deposit the dissolved metal on a variety of metal cathodes. The metals used for the cathodes may include gold, silver, copper and aluminium. The metals would typically be in foil form but they could be in shredded foil form.

The cathodes are preferably in the form of parallel plates.

The voltage is applied to the electrolytic cell before electrolytic addition to apply cathodic protection to the aluminium cathodes and prevent them being dissolved by the hot alkaline electrolyte.

The electrolysis is typically continued until the concentration of gold in the electrolyte falls to less than 10 ppm. Cell design is preferably such that adequate cathode area is provided to reduce the gold concentration from its maximum value to less than 10 ppm in an overnight 16 hour period using plain aluminium foil or in a four hour period using shredded aluminium foil. Cell design also preferably fulfils the need to contain the entire electrolyte in a single charge.

At the completion of the plating period parallel plate cathodes may be lifted from the cell and the aluminium backing dissolved in a sodium hydroxide solution leaving the gold foil in a pure form suitable for smelting. The entire cell contents are filtered to recover any fine gold which did not form an adherent plate.

Preferably, during the electrolysis step, the current density is controlled so as to selectively electrodeposit gold and silver onto the aluminiun cathode and leave other metals such as copper in the electrolyte. The silver content varies with the amount of cyanide soluble silver compounds in the original ore. In cases where this silver is about equal to or less than the gold concentration then co-deposition occurs. In cases where this silver is significantly higher than the gold then the silver will be deposited before the gold. Alternatively, it can be precipitated before electrolysis by use of an appropriate amount of sodium sulphide. Most preferably, the current density is in the range from 0.0015 to 0.005 amp per sq. centimetre of cathode surface. If the cathode is not aluminium, it is conveniently formed of a material with which the deposited metal is compatible. For example, copper or silver or gold cathodes can be used for gold recovery since these can be recovered during the gold refining process. The use of aluminium is preferred however since it is cheaper, readily available, and easily dissolved on completion of the plating process. The present invention will now be illustrated by the following examples.

EXAMPLE 1

Pilot plant conditions using an apparatus of the type shown in the accompanying drawing A charge of 25 liters of pregnant carbon containing gold to 5330 g/t, was presoaked in a solution containing 50 g/l sodium cyanide and 10 g/l sodium hydroxide for one hour. This conditioned carbon was charged into the fractionating column and 15 liters of methanol run into the evaporator and heated to boiling point of 67° C.

The methanol vapour rose, entered the carbon and gradually displaced water containing gold and reagent from the carbon. This aqueous liquid gravitated to the evaporator. The evaporator temperature gradually rose to 70° C. and the temperature in the carbon gradually rose to near 100° C. then fell to 67° C. as the methanol saturated the carbon and rose as a vapour to the condenser from which it returned to the carbon as a condensate.

The elution process continued for 16 hours. Then the condensate from the condenser was directed to a storage tank and the temperature in the evaporator gradually increased to near 100° C. as the system became impoverished of methanol.

The aqueous solution in the evaporator was then transferred to an electrolytic cell containing an aluminium cathode and subjected to electrolysis to deposit the gold. The gold content of this electrolyte was determined at 11,000 g/t. Electrolysis was continued for 4 hours when the gold content of the electrolyte was determined at 4 g/t. The plated cathode was removed and placed in an alkaline bath when the aliminium was dissolved away. The gold content of the desorbed carbon was determined at 205 g/t.

| Efficiency calculations | |
| --- | --- |
| Gold desorption from carbon | 96.15% |
| Gold electrodeposition | 99.96% |
| Overall gold recovery | 96.11% |

EXAMPLE 2

Operating plant conditions

A charge of 200 liters of pregnant carbon containing gold was conditioned with a caustic-cyanide solution of the same concentration and for the same time as Example 1.

This charge was charged into the 200 liter fractionating column and 120 litres of methanol was heated in the evaporator to boiling point of 67° C. The methanol vapour rose and entered the conditioned carbon and the water-gold reagent solution gravitated to the evaporator. The evaporator temperature soon stabilized at 70° C. and the upper portion of the carbon attained a constant temperature of 67° C., similar to Example 1. This condition was maintained for 16.5 hours after which the condensate was directed out of the system to storage.

When the temperature in the system attained close to 100° C. the solution in the evaporator was transferred to the electrolytic cell as in Example 1. It then contained gold to the concentration of 3300 ppm. Electrodeposition continued for 16 hours when the gold concentration in the spent electrolyte was determined at 3 ppm. The aluminium cathodes were removed and dissolved as in Example 1.

The carbon was discharged and assayed for gold.

| Efficiency calculations | |
| --- | --- |
| Gold desorbed from carbon | 91.0% |
| Gold electrodeposition | 99.9% |
| Overall efficiency | 90.9% |

Modifications and variations such as would be apparent to a skilled addressee are deemed within the scope of the present invention.

We claim:

1. A gold recovery process in which a particulate material containing water and having adsorbed thereon a solubilised gold compound is located in packed form in a fractionating column, a liquid containing a major proportion of water miscible organic liquid is placed in an evaporator and boiled such that it enters the packed fractionating column as a vapour, said water miscible organic liquid being more volatile then water and being preferentially retained in the column, and the water content of the particulate material draining into the evaporator in admixture with organic liquid and carrying with it the dissolved gold.

2. A process acording to claim 1, in which the particulate material is activated carbon.

3. A process according to claim 1, in which the organic liquid is a water miscible alcohol.

4. A process according to claim 3, in which the organic liquid is methanol.

5. A process according to claim 1, in which the volume of organic liquid is less than one bed volume.

6. A process according to claim 5, in which fractionation is continued until at least about 90% by weight of the adsorbed gold has been removed to the evaporator.

7. A process according to claim 1, in which the evaporator contains at least about 3000 milligrams per liter of dissolved gold at the termination of fractionation.

8. A process according to claim 1, in which following completion of fractionation and solvent recovery, the gold bearing aqueous liquid from the evaporator is subjected to electrolysis or cementation to separate gold from the liquid.

9. A process according to claim 1, in which following completion of fractionation and solvent recovery, the gold bearing aqueous liquid is processed in a cell with an aluminium cathode and a metal anode and subjected therein to electrolysis to deposit a gold containing foil on the cathode.

10. A process according to claim 1, in which following completion of fractionation and solvent recovery, the gold bearing aqueous liquid is processed in a cell with an aluminium cathode and a metal anode and subjected therein to electrolysis to deposit a gold containing foil on the cathode, and in which subsequent to termination of electrolysis the aluminium cathode is dissolved by an alkali.

11. A process according to claim 1, in which following completion of fractionation and solvent recovery, the gold bearing aqueous solution is placed in a cell comprising a gold, silver, aluminium or copper cathode and an inert electrode, and subjected to electrolysis in the cell so as to deposit a gold foil on the cathode.

12. A method according to claim 11 in which the cathode is aluminium and the current density during electrolysis is between 0.0015 and 0.005 amps per square centimetre of cathode area.

13. A method according to claim 11, in which the gold bearing aqueous solution is alkaline and has a pH of at least 10.

14. A process according to claim 1 and further including the steps of supplying the vapour from the top of the column to a condenser, returning the condensed vapour to the top of the column and permitting the condensed vapour to move by gravity down the column countercurrent to the rising vapour.

* * * * *

UNITED STATES PATENT AND TRADEMARK OFFICE
CERTIFICATE OF CORRECTION

PATENT NO. : 4,468,303

DATED : August 28, 1984

INVENTOR(S) : Arnold F. Griffin and Michael C. Costello

It is certified that error appears in the above-identified patent and that said Letters Patent is hereby corrected as shown below:

On the face of the patent, after "[22] Filed: Dec. 1, 1982" insert the following:

```
--[30]     Foreign Application Priority Data
    Dec. 4, 1981 [AU]  Australia.............PF1828
    Mar. 12, 1982 [AU] Australia.............PF3084--
```

Signed and Sealed this

Seventh Day of May 1985

[SEAL]

Attest:

DONALD J. QUIGG

Attesting Officer     Acting Commissioner of Patents and Trademarks